(12) United States Patent
Eichholz et al.

(10) Patent No.: US 8,953,804 B2
(45) Date of Patent: Feb. 10, 2015

(54) METHOD FOR ESTABLISHING A SECURE COMMUNICATION CHANNEL

(75) Inventors: Jan Eichholz, München (DE); Gisela Meister, München (DE); Dirk Wacker, München (DE); Markus Sauermann, München (DE)

(73) Assignee: Giesecke & Devrient GmbH, Munich (DE)

( * ) Notice: Subject to any disclaimer, the term of this patent is extended or adjusted under 35 U.S.C. 154(b) by 194 days.

(21) Appl. No.: 13/497,443

(22) PCT Filed: Sep. 22, 2010

(86) PCT No.: PCT/EP2010/005800
§ 371 (c)(1),
(2), (4) Date: Apr. 12, 2012

(87) PCT Pub. No.: WO2011/035899
PCT Pub. Date: Mar. 31, 2011

(65) Prior Publication Data
US 2012/0189125 A1    Jul. 26, 2012

(30) Foreign Application Priority Data
Sep. 22, 2009 (DE) .......... 10 2009 042 284

(51) Int. Cl.
| | |
|---|---|
| H04L 29/06 | (2006.01) |
| H04L 9/08 | (2006.01) |
| G06Q 20/32 | (2012.01) |
| G06Q 20/38 | (2012.01) |
| G07F 7/10 | (2006.01) |

(52) U.S. Cl.
CPC .......... *H04L 9/0841* (2013.01); *H04L 63/0442* (2013.01); *H04L 9/0825* (2013.01); *G06Q 20/32* (2013.01); *G06Q 20/3823* (2013.01); *G07F 7/1016* (2013.01)
USPC ..................................................... 380/270

(58) Field of Classification Search
CPC .. H04L 9/0825; H04L 9/0841; H04L 63/0442
USPC ................. 713/182, 183, 184; 380/270
See application file for complete search history.

(56) References Cited

U.S. PATENT DOCUMENTS

| | | | |
|---|---|---|---|
| 6,278,782 B1* | 8/2001 | Ober et al. ............ | 380/264 |
| 2003/0108206 A1* | 6/2003 | Diehl et al. ............ | 380/277 |

(Continued)

FOREIGN PATENT DOCUMENTS

| | | |
|---|---|---|
| DE | 102007050480 A1 | 4/2009 |
| DE | 102007000589 B9 | 1/2010 |

(Continued)

OTHER PUBLICATIONS

International Search Report for PCT/EP2010/005800, Feb. 2, 2011.

(Continued)

*Primary Examiner* — Michael S McNally
(74) *Attorney, Agent, or Firm* — Workman Nydegger

(57) ABSTRACT

In a method for establishing a secure communication channel between a portable data carrier (10) and a terminal on the basis of an asymmetric cryptosystem, a value (X; Y; V; W) derived from a public key (PKD; PKT) of the cryptosystem is displayed on a display device (40) of the data carrier (10).

23 Claims, 7 Drawing Sheets

(56) References Cited

U.S. PATENT DOCUMENTS

| | | | |
|---|---|---|---|
| 2006/0265594 A1* | 11/2006 | Kuhls et al. | 713/176 |
| 2007/0283160 A1* | 12/2007 | Steven et al. | 713/182 |
| 2009/0034730 A1* | 2/2009 | Rover et al. | 380/270 |
| 2009/0039156 A1* | 2/2009 | Brandli et al. | 235/382 |
| 2009/0313475 A1* | 12/2009 | Roscoe et al. | 713/181 |
| 2010/0223479 A1 | 9/2010 | Nguyen et al. | |
| 2011/0047036 A1* | 2/2011 | Foran-Owens et al. | 705/17 |

FOREIGN PATENT DOCUMENTS

| | | | |
|---|---|---|---|
| EP | 0535863 | A2 | 4/1993 |
| EP | 0566811 | A1 | 10/1993 |
| WO | 2008078101 | A2 | 7/2008 |
| WO | 2009053249 | A1 | 4/2009 |

OTHER PUBLICATIONS

Hoepman, Jaap-Henk, "Ephemeral Pairing on Anonymous Networks", Lecture Notes in Computer Science, Springer, DE, vol. 3450, Jan. 1, 2005, pp. 101-116.

International Preliminary Report on Patentability for PCT/EP2010/005800, Apr. 3, 2012.

* cited by examiner

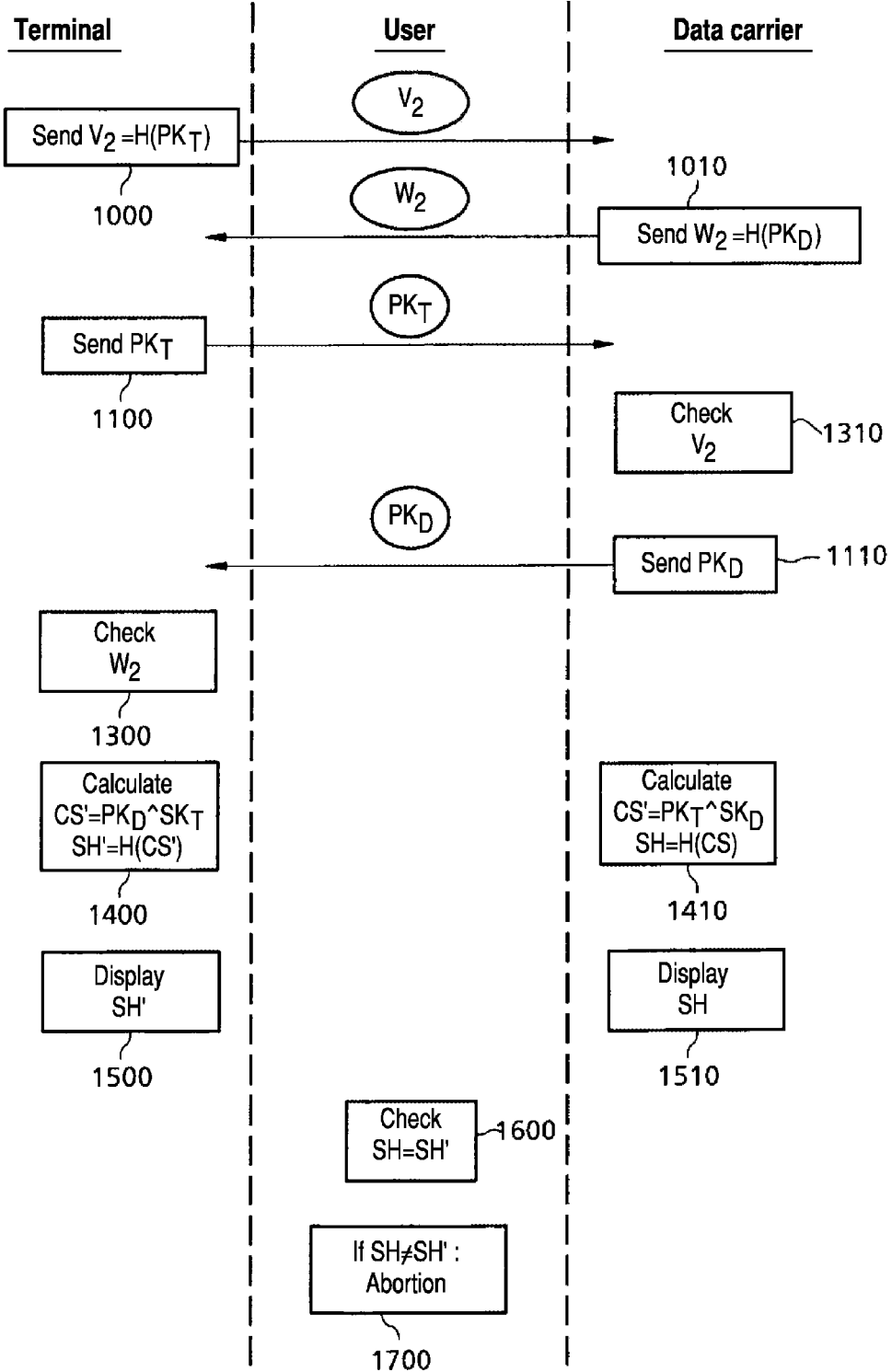

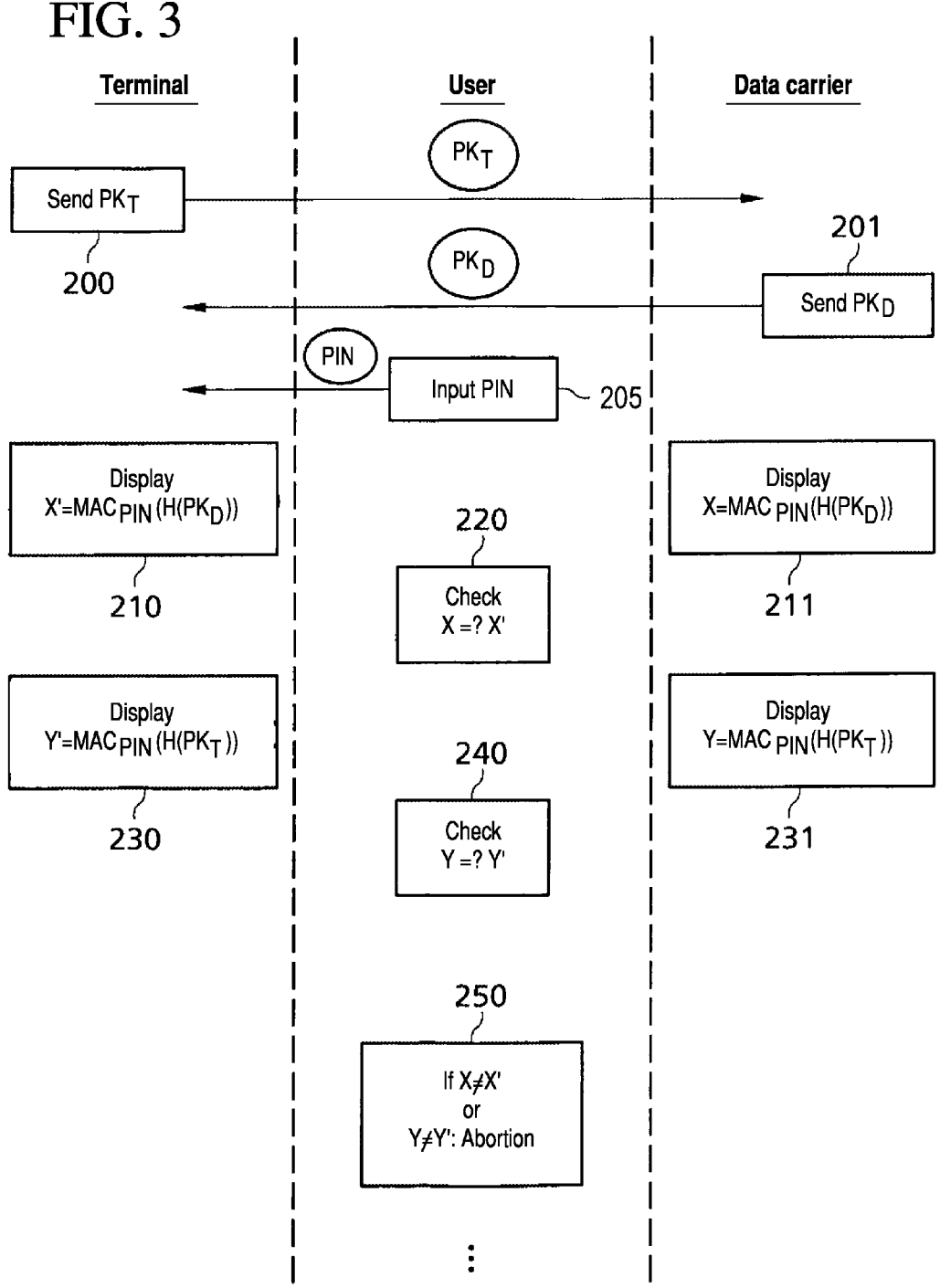

METHOD FOR ESTABLISHING A SECURE COMMUNICATION CHANNEL

BACKGROUND OF THE INVENTION

A. Field of the Invention

The present invention relates to a method for setting up a secured communication channel between a portable data carrier and a terminal on the basis of an asymmetric crypto system as well as to a correspondingly adapted portable data carrier.

B. Related Art

A secured data communication between a portable data carrier, for example a chip card, and a terminal adapted for the communication with the data carrier is effected via a secured communication channel, by the transmitted data being transmitted in an encrypted manner. The data transmission here can be effected in a contact-type or contactless manner. An efficient and secure encryption is ensured by means of known symmetric encryption techniques, for example AES, DES or the like. However, for this, the exchange of a secret key between the two partners is necessary.

This exchange is normally effected by means of an asymmetric method, for example the Diffie-Hellman key exchange method. Such an asymmetric method, with which public keys of a corresponding crypto system are transmitted via an insecure communication channel, is vulnerable to so-called man-in-the-middle attacks (MIM). Here, an attacker eavesdrops on the unsecured communication channel and pretends vis-à-vis each of the two communication partners to be the respective other one, without this being recognizable to the two communication partners. In this way the attacker can eavesdrop on the entire data communication and also manipulate it, in particular can obtain an exchanged "secret" key and with this manipulate the following data communication between the data carrier and the terminal.

It is the object of the present invention to support the setting up of a secured communication channel between a portable data carrier and a terminal, in particular to make man-in-the-middle attacks against the communication channel more difficult.

SUMMARY OF THE INVENTION

The invention is based on the basic idea to include a display device of the data carrier in the method, in particular for authenticating a public key of the crypto system.

Accordingly, upon a method according to the invention for setting up a secured communication channel between a portable data carrier and a terminal on the basis of an asymmetric crypto system, a value derived from a public key of the crypto system is displayed on a display device of the data carrier.

A corresponding data carrier according to the invention comprises a display device as well as a control device for setting up a secured communication channel to a terminal on the basis of an asymmetric crypto system via a data communication interface of the data carrier. The control device here is adapted, according to the invention, to display a value derived from a public key of the crypto system on the display device. Preferably, the data carrier has an input device.

In this way, it is possible to prevent a man-in-the-middle attack on the communication channel or at least to recognize it. Upon such an attack, the attacker intercepts a public key transmitted via the communication channel and replaces it by a different key chosen by the attacker himself. When, however, on the display device of the data carrier there is displayed a value, which for example has been derived from the public key—supposedly—received from the terminal, e.g. a so-called fingerprint of the key, a user of the data carrier can visually check whether the displayed value matches the publicly known fingerprint of the public key of the terminal. If this is not the case, then the key received by the data carrier does not correspond to the public key of the terminal, but to a key smuggled in by an attacker. An attack on the communication channel can therefore be reliably recognized and an unsecured transmission of sensitive data be effectively prevented.

Preferably, also on a display device of the terminal there is displayed a corresponding value derived from a public key, for example the above-mentioned fingerprint. This facilitates the direct visual check of the identity of the derived value displayed on the display device of the data carrier with the corresponding value that is known but additionally displayed on the display device of the terminal.

According to a preferred embodiment of the method according to the invention, there are displayed both on the display device of the data carrier and on the display device of the terminal, preferably one after the other, both a value derived from a public key of the data carrier and a value derived from a public key assigned to the terminal. This embodiment is particularly suitable for securing the transmission of the public keys between the data carrier and the terminal during a Diffie-Hellman key exchange method. Here, one communication partner sends a public key assigned to him to the respective other communication partner. Through the both-sided displaying of the values derived from the sent and received keys, a user of the data carrier can visually check whether the public key sent by his data carrier to the terminal has been received there unchanged, on the one hand, and whether the key received by the data carrier actually corresponds to the public key of the terminal, on the other hand.

According to a further variant of the invention, at the beginning of the communication between terminal and data carrier there is respectively exchanged a derived value of the public key assigned to the communication partner. In a following method step, then the respective public key is transmitted and its derived value verified by the communication partner. Subsequently, the terminal forms, according to an asymmetric encryption based on a Diffie-Hellman key exchange method, a common secret from the public key of the data carrier and the private key of the terminal, while the data carrier forms the common secret from the public key of the terminal and the private key of the data carrier. The derived value of the common secret is transmitted to the respective other communication partner. In this variant, too, a user of the data carrier can visually check whether the common secret sent by his data carrier to the terminal has been received there unchanged, on the one hand, and whether the secret received by the data carrier actually corresponds to the sent secret of the terminal, on the other hand.

According to a further variant of the inventive method, the data carrier generates a random number and transmits a derived value of the random number and a public key assigned to the data carrier to the terminal. Further, by the terminal there is generated a random number, this is transmitted, encrypted with the public key of the data carrier, to the data carrier and subsequently decrypted by it. Subsequently, the random number generated by the data carrier is transmitted to the terminal and the derived value thereof is verified by the terminal. In a further step, both the terminal and the data carrier form a derived value from the random number of the card, from the random number of the terminal, and from the public key of the data carrier and display it. Here, too, the user again can visually check the match of the values.

In other cryptographic methods for setting up a secured communication channel, upon which only one public key is transmitted from one communication partner to the other, there is accordingly omitted the display of the other—not sent and not received—public key of the other communication partner.

The visual check by the user of the data carrier as to whether a value displayed on the display device of the data carrier matches a corresponding value displayed on the display device of the terminal, whereby the two values have been respectively derived from a same public key in the same way, can be replaced by an automatic check in the data carrier or in the terminal. If the data carrier comprises an input device, for example a keyboard, then the value displayed on the display device of the terminal, which has been derived for example from the public key of the terminal, can be input to the data carrier via the keyboard. The control device of the data carrier is then adapted to compare the input value with a value which has been derived in a specified manner from the public key of the terminal received by the data carrier from the terminal. Non-matching values indicate an attack on the communication channel.

In an analogous way, also a value displayed on the display device of the data carrier, which for example has been derived from the public key of the data carrier, can be input to the terminal via an input device of the terminal and be compared there in the described manner with a value which has been derived from a public key of the data carrier received by the terminal from the data carrier.

Alternatively or additionally, the other derived values can be displayed and be input to the other apparatus for checking, i.e. the value displayed on the display device of the terminal, which has been derived from the data carrier's public key received by the terminal, can be input to the data carrier for checking, and/or the value displayed on the display device of the data carrier, which has been derived from the terminal's public key received by the data carrier, can be input to the terminal for checking.

A value derived from a public key of the crypto system, such as for example a fingerprint of a key, is preferably formed by means of a hash function. Here, the entire hash value or optionally only a part of it may be displayed, for example when a display device of the data carrier can only display a limited number of digits of such a value. It is also possible to form the hash value or the like not directly from the public key, but from a value which in turn depends on the public key, for example a secret key formed by means of the public key, which secret key is only known to the data carrier and the terminal. Instead of a hash function, there can also be used other suitable functions for forming the derived value.

Alternatively or additionally, for forming the derived value there can be used an authentication check value (message authentication code, MAC) which for example is additionally formed via the above-described hash value. An authentication check value usually is shorter than a hash value and can therefore be completely displayed also on a small display device of a data carrier and thus without security loss. However, for calculating an authentication check value one needs a secret datum which is known only to the data carrier and to the terminal, for example a PIN or the like.

According to an embodiment of the method of the invention there is provided a PIN or an analogous secret datum known only to the terminal and to the data carrier but otherwise to be kept secret. Such a PIN can be used, as mentioned, to form an authentication check value which in turn can be used to form the value derived from a public key. Such a PIN, however, can also be used to encrypt a public key before the transmission, for example from the data carrier to the terminal. With this, the transmission of the key is already secured against man-in-the-middle attacks. Also other steps of protocols used can be secured by means of the PIN, as described below, in particular setting up a secure communication channel itself.

The PIN or an analogous secret datum can in this connection be generated or specified by the data carrier or by the terminal. On the one hand, it is possible that the data carrier specifies the PIN, for example by it being stored in the data carrier or being generated within the data carrier and being displayed on the display device of the data carrier. The displayed secret datum can then be input to the terminal via an input device, for example, a keyboard. However, vice versa, also the terminal can generate and display the PIN, which is then input to the data carrier via a corresponding input device or is in any other way transmitted to the data carrier.

In general, there can also be provided a further method according to the invention for setting up a secured communication channel between a portable data carrier and a terminal on the basis of a crypto system based on a secret datum, i.e. the crypto system here needs not necessarily be additionally based on a described asymmetric key architecture. Normally, however, this will be the case. According to such a method, the secret datum is made available by the terminal, for example is generated therein and displayed on a display device of the terminal. The displayed secret datum is subsequently transferred to the data carrier. A corresponding data carrier according to the invention comprises a display device as well as a control device for setting up a secured communication channel to a terminal on the basis of a crypto system based on a secret datum via a data communication interface of the data carrier. The control device here is adapted, according to the invention, to display a secret datum received via the data communication interface or an input device of the data carrier on the display device.

The secret datum here can be transferred to the data carrier by a user of the data carrier inputting it to the data carrier via an input device of the data carrier, for example a keyboard. The input device here can also be configured in an alternative manner, for example as an optical sensor or the like. The input secret datum can then be displayed on the display device of the data carrier. Such a display step, however, can also be omitted.

It is also possible to transfer the secret datum to the data carrier, according to a suitable communication protocol, in a contactless or contact-type manner, via an ordinary data communication interface of the data carrier. The secret datum transferred in this way is then displayed on the display device of the data carrier for the purpose of verifying the error- and manipulation-free transfer.

DESCRIPTION OF THE DRAWINGS

In the following the invention is described by way of example with reference to the accompanying Figures.

DETAILED DESCRIPTION OF PREFERRED EMBODIMENTS OF THE INVENTION

FIG. 2 to FIG. 6 schematically show steps of different embodiments of the method according to the invention.

Figure 1:
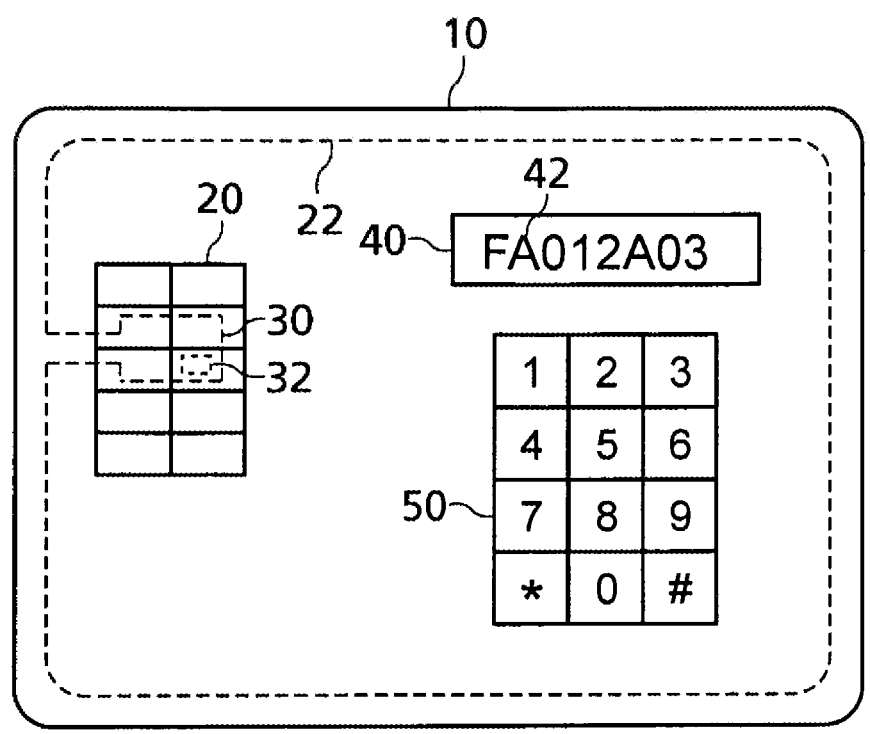
FIG. 1 shows a preferred embodiment of a data carrier according to the invention.

With reference to FIG. 1 a portable data carrier 10, which here is represented as a chip card, comprises a data communication interface 20 in the form of a contact field adapted for the contact-type data communication and a data communication interface in the form of an antenna coil 22 adapted for the contactless data communication. One of the two data communication interfaces 20, 22 may be omitted. The energy supply of the data carrier 10 can be effected via the data communication interfaces 20, 22 through the terminal or via a separate energy supply of the data carrier 10, for example a battery (not shown).

The two data communication interfaces 20, 22 are connected with an integrated circuit 30 embedded in a data carrier body, whereby the integrated circuit controls the data carrier 10 by means of a control device 32.

Furthermore, the data carrier 10 comprises a display device 40 in the form of a display screen as well as an input device 50 in the form of a keyboard. Alternative or further display and input devices can be provided. The display device 40 is adapted to display contents generated by the control device 32 and transmitted to the display device 40. The input device 50 can be used to input data to the data carrier 10, which then are further processed by the control device 32.

The control device 32 is in particular adapted to set up, on the basis of an asymmetric crypto system, a secured data communication channel to a terminal (not shown) via one of the data communication interfaces 20, 22. The control device 32 is adapted to send a public key of the data carrier 10 to a terminal or to receive a public key of a terminal and to further process it depending on the communication protocol used, for example for determining a secret session key for symmetrically encrypting data to be transmitted between the data carrier 10 and the terminal. The control device 32 can form values 42 derived from the public keys, for example by means of a hash function and/or an authentication check value, and transmit them to the display device 40 for displaying. Further, the control device 32 is adapted to generate a secret datum, for example in the form of a PIN or the like, and to optionally transmit it to the display device 40 for displaying or to receive such a secret datum via a data communication interface 20, 22 or via the input device 50, to manage it and to further process it as intended.

Different methods for setting up a secured communication channel between the data carrier 10 and a terminal are described in more detail in the following with reference to the FIGS. 2 to 5.

Figure 2:
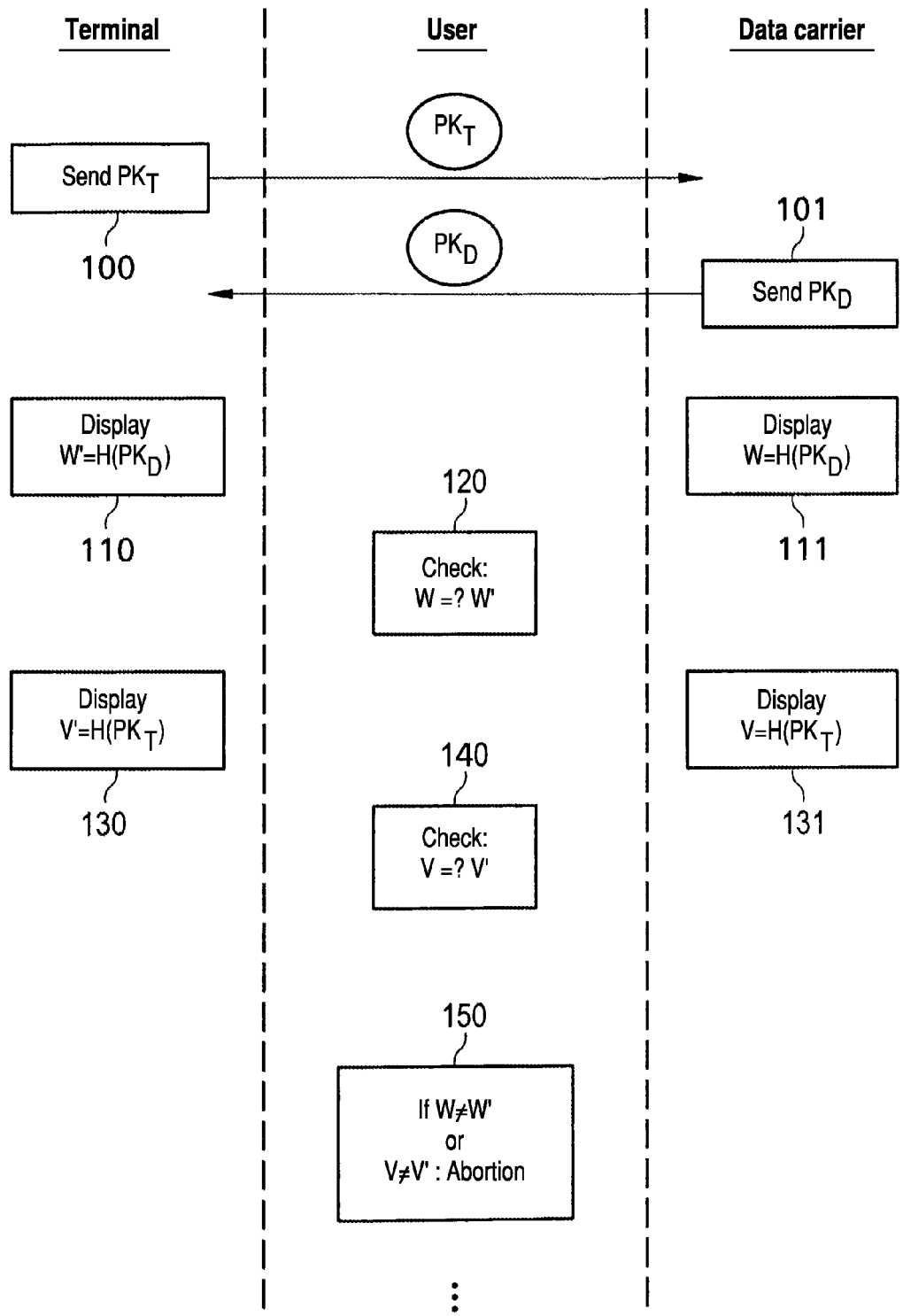

With reference to FIG. 2, according to a first embodiment, in the steps 100, 101 there are exchanged public keys between the data carrier 10 and the terminal, i.e. data carrier 10 sends its public key $PK_D$ to the terminal in step 101, which in step 100 sends its public key $PK_T$ to the data carrier 10.

In step 110, the terminal forms, by means of a hash function H, a value $W'=H(PK_D)$ derived from the received public key $PK_D$ of the data carrier 10 and displays this value W' on a display device of the terminal, for example a display screen.

Analogously, also the data carrier 10 determines a value $W=H(PK_D)$, by it applying the hash function H to its public key $PK_D$. The data carrier 10 also displays this value W via its display device 40 in step 111.

A user of the data carrier can therefore check in step 120 whether the two values W and W' match. If this is the case, the user can assume that the public key $PK_D$ has not been manipulated by an unnoticed man-in-the-middle attack upon the transmission from the data carrier 10 to the terminal.

In the same way, now the terminal determines a derived value $V'=H(PK_T)$ by applying the hash function H to its public key $PK_T$ and displays this value in step 130 on its display device.

Likewise, in step 131 the data carrier 10 displays on its display device 40 the derived value $V=H(PK_T)$, which results from an application of the hash function H to the public key $PK_T$ of the terminal received from the terminal.

The user checks in step 140 also the identity of these two values V and V' and can be sure that, if identity is given, the public key $PK_T$ of the terminal has been received unchanged in the data carrier 10.

If both checks 120, 140 turn out positive, the communication channel between the data carrier 10 and the terminal can be securely set up. In the opposite case, when at least one of the two checks 120, 140 has yielded non-identity, the method is aborted 150.

Instead of a complete hash value $H(PK_T)$ or $H(PK_D)$, there can also be displayed in the steps 131 and 111 only a portion of a corresponding hash value, if the display device 40 of the data carrier 10 cannot represent the complete hash value. The comparison in the steps 120, 140 then relates only to the corresponding displayed portion and accordingly involves some uncertainty. Instead of a hash function H, there can be used a different, suitable function for forming the derived values V, V', W, W'. It is also possible that the derived values are not derived from the public keys $PK_T$, $PK_D$, but from values directly or indirectly derived from these keys, for example from a session key determined by means of the keys.

A variation of the method according to FIG. 2 is represented in FIG. 2a. According to the represented embodiment, values of public keys derived in the steps 1000, 1010 are exchanged between data carrier 10 and terminal. Here, the terminal sends in step 1000 a value $V_2=H(PK_T)$ of its public key $PK_T$, derived by means of a hash function, to the data carrier 10, which in step 1010 sends a value $W_2=H(PK_D)$ of its public key $PK_D$, derived by means of a hash function, to the terminal.

The hash functions used therefor are preferably collision-resistant hash functions, such as for example SHA-2.

Subsequently, in step 1100 the terminal sends the public key $PK_T$ to the data carrier 10, which in step 1310 checks the derived value $V_2=H(PK_T)$. Accordingly, the data carrier 10 sends the public key $PK_D$ in step 1110 to the terminal, which in step 1300 checks the derived value $W_2=H(PK_D)$.

Both the terminal and the data carrier now calculate in step 1400 or 1410 a common secret $CS'=PK_D\char`^SK_T$ or $CS=PK_T\char`^SK_D$ according to the asymmetric Diffie-Hellman method.

From the two values CS' and CS, in step 1400 and 1410, there is further formed by means of a hash function a derived value, which, as represented in step 1500, 1510, is displayed respectively. Here, too, there can be displayed only a part of the hash function, when the display device 40 of the data carrier 10 is not able to represent it completely. A different function than a hash function is also conceivable for forming the derived values. Moreover, the derived values may not be determined directly from the public keys, but from values derived directly or indirectly from these keys.

The user checks the match of the two values in step 1600. If this is the case, the user can assume that the public keys $PK_D$ and $PK_T$ were not manipulated through a man-in-the-middle attack upon the transmission from the data carrier to the terminal and vice versa. Accordingly, thereafter, a communication channel can be securely set up. Otherwise, as represented in step 1700, the connection is interrupted.

The method illustrated with reference to FIG. 3 differs from the method in FIG. 2 by the fact that for forming the values X, X', Y, Y' derived from the public keys $PK_T$, $PK_D$ exchanged in the steps 200, 201, besides a hash function H there is also formed an authentication check value (MAC, message authentication code) on the basis of a PIN. For this, a user of the data carrier 10 inputs in step 205 a PIN to the terminal via an input device, e.g. a keyboard.

The PIN is specified in this case by the data carrier 10. In the simplest case, the PIN can be firmly assigned to the data carrier 10 upon the manufacturing, for example be printed on or stored in a memory of the data carrier 10. The data carrier 10 can also be adapted to generate the PIN session-specifically and to display it, as a stored PIN, on the display device 40 when required. It is also possible, but not represented in FIG. 3, that the PIN is stored in the terminal or is generated session-specifically in the terminal and is displayed via the display device of the terminal. There the user then can read the PIN and input it to the data carrier via the input device 50. Other ways for transfering the PIN from the terminal to the data carrier are possible.

In the steps 210, 211 and 230, 231 now the terminal or the data carrier do not display on their respective display devices the hash values $H(PK_D)$, $H(PK_T)$ over the respective public keys $PK_D$, $PK_T$, but authentication check values $MAC_{PIN}(H(PK_D))$ or $MAC_{PIN}(H(PK_T))$ which have been formed by means of the PIN in the known way over the hash values $H(PK_D)$, $H(PK_T)$, for example by means of block ciphers. Such a MAC, formed over a hash value, is shorter than the hash value and can thus be completely displayed also on a small display device of the portable data carrier 10, and thus without security losses. The MAC can alternatively be formed also directly over the respective public keys $PK_D$, $PK_T$.

Accordingly, in the steps 220 and 240 there is checked the identity of the MAC-values instead of the identity of the hash values.

Figure 4:
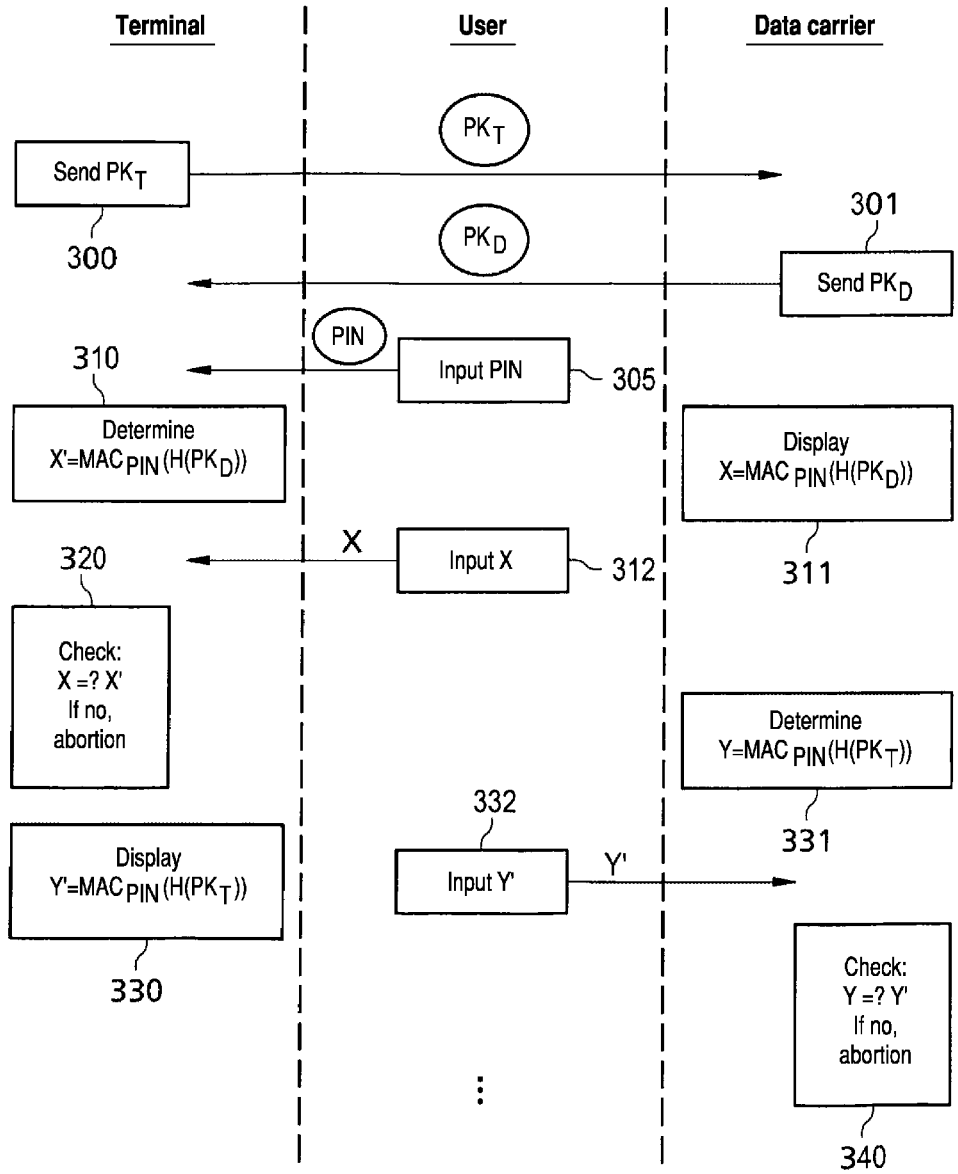

The method represented with reference to FIG. 4 differs from the method in FIG. 3 by the fact that the check of the identity of the MAC-values is not visually checked by the user, but by machine through the terminal and the data carrier 10. For this purpose, in step 312 the user inputs the MAC-value $X=MAC_{PIN}(H(PK_D))$, displayed in step 311 on the display device 40 of the data carrier 10, to the terminal. There, in step 320 this value is compared with the MAC-value $X'=MAC_{PIN}(H(PK_D))$ already determined in step 310 within the terminal. If the two values do not match, the terminal aborts the method.

If the values match, then, vice versa, the terminal displays, as in the method in FIG. 3, the MAC-value $Y'=MAC_{PIN}(H(PK_T))$ on its display device in step 330. The user inputs the value Y' in step 332 to the data carrier 10 via the input device 50 of the data carrier 10. There, the input value is compared in step 340 with the MAC-value $Y=MAC_{PIN}(H(PK_T))$ determined within the data carrier in step 311. In case of non-identity, the data carrier 10 aborts the method, otherwise it is continued as provided.

As already described with reference to FIG. 3, also in this embodiment according to FIG. 4, the PIN can be alternatively specified by the terminal.

Likewise, it is possible to combine the concept represented with reference to FIG. 4 with the embodiment of FIG. 2. I.e., inputting the derived value displayed by means of one of the devices to the respective other device for the guaranteed faultless machine-check there, is in principle also possible without a PIN. In the method according to FIG. 2 there are calculated only hash values, but no MACs, so that a PIN is not required.

Figure 5:
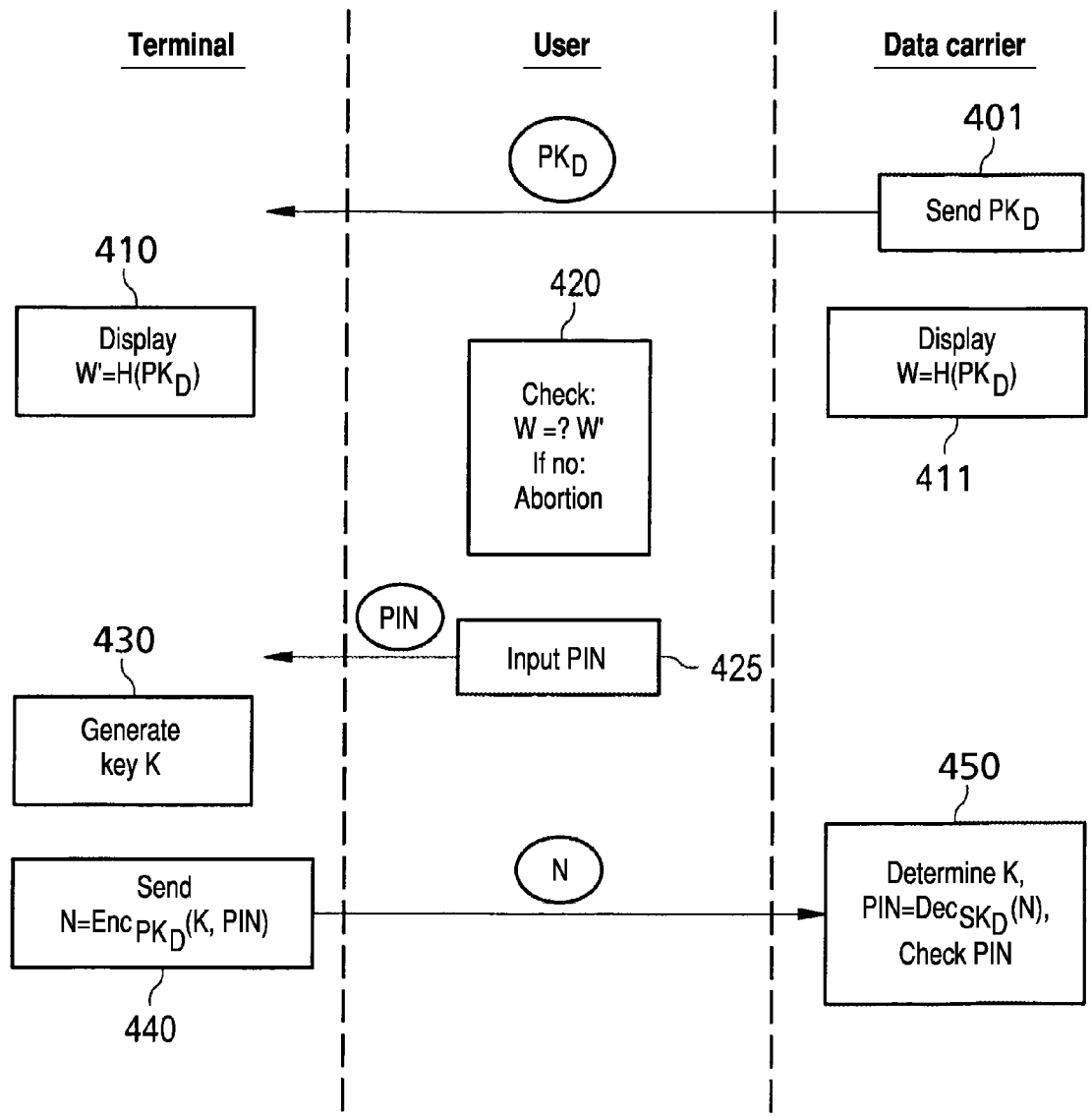

With reference to FIG. 5 there is described an embodiment in which only one public key, namely that of the data carrier 10, $PK_D$, is transferred to the terminal in step 401. In the steps 410 and 411 there are again displayed, as already in the method of FIG. 2, a hash value $W'=H(PK_D)$ by the terminal, calculated over the key $PK_D$ received from the data carrier 10, and a hash value $W=H(PK_D)$ by the data carrier 10, calculated over the public key $PK_D$ assigned to the data carrier 10. The user checks in step 420, as described, the identity of these two displayed values W, W'.

In a manner also already described, a PIN is input to the terminal in step 425. This step can also be omitted.

The terminal determines in step 430 in a suitable manner, possibly using the PIN, a secret key K which in step 440 is transmitted as value $N=ENC_{PK^D}(K, PIN)$, possibly together with the PIN, encrypted with the help of the received public key $PK_D$ to the data carrier 10.

The data carrier 10 decrypts the value N by means of its private key $SK_D$ of the crypto system, in order to get the secret key K, and optionally checks the PIN also received with the message N.

The method according to FIG. 5 can be modified to the effect that the public key $PK_D$ is already encrypted by means of the PIN before it is transmitted to the terminal. The PIN here can be input to the terminal already before the transmission of the key $PK_D$. At least, inputting the PIN must be effected before the display of the hash values, because otherwise the hash value over the unencrypted key $PK_D$ cannot be formed within the terminal.

In a further, not shown method for setting up a secure communication channel, the terminal displays in a first step, as described above with reference to FIG. 3, a secret datum in the form of a PIN (personal identification number), of a SIN (session identification number) or the like. The secret datum is subsequently input to the data carrier 10 via the input device 50 by the user. Alternatively, it is possible to transmit the secret datum to the data carrier via a different way, for example via an optical sensor, via an air interface (OTA) or the like. For verifying purposes, the transferred secret datum can be displayed on the display device 40 of the data carrier 10, in particular when it has not been input by the user itself Now, every method based on such a secret datum, which does not necessarily depend [on—added by the Translator] an asymmetric crypto system, can be used to set up a secured communication channel—at least partly based on the secret datum. Normally, in such methods, too, an asymmetric crypto system is involved, as for example described with reference to FIGS. 3 to 5. Also known methods based on a secret datum, such as PACE, PACE-EU, SPEKE and the like, which do not require a display device in the data carrier to set up a secure channel between the data carrier and the terminal, can be carried out in the described manner.

Instead of an alphanumeric secret datum, there can also be provided the transmission of a picture or of a pictogram. In this way, to a user of a—contactless—data carrier 10 it can be represented for example easier with which terminal the data carrier 10 is connected.

A simple data carrier without a display device and without an input device can be extended for example by means of a mobile radio end device, with which the data carrier, e.g. a (U)SIM mobile radio card, is connectable, with the necessary functionalities for carrying out the described methods. I.e. the display device and the input device are made available through the mobile radio end device connected with the data carrier.

It is further possible to set up a secure data communication channel between two contactlessly communicating data carriers 10 in the way described, i.e. one of the data carriers plays the role of the terminal here.

Figure 6:
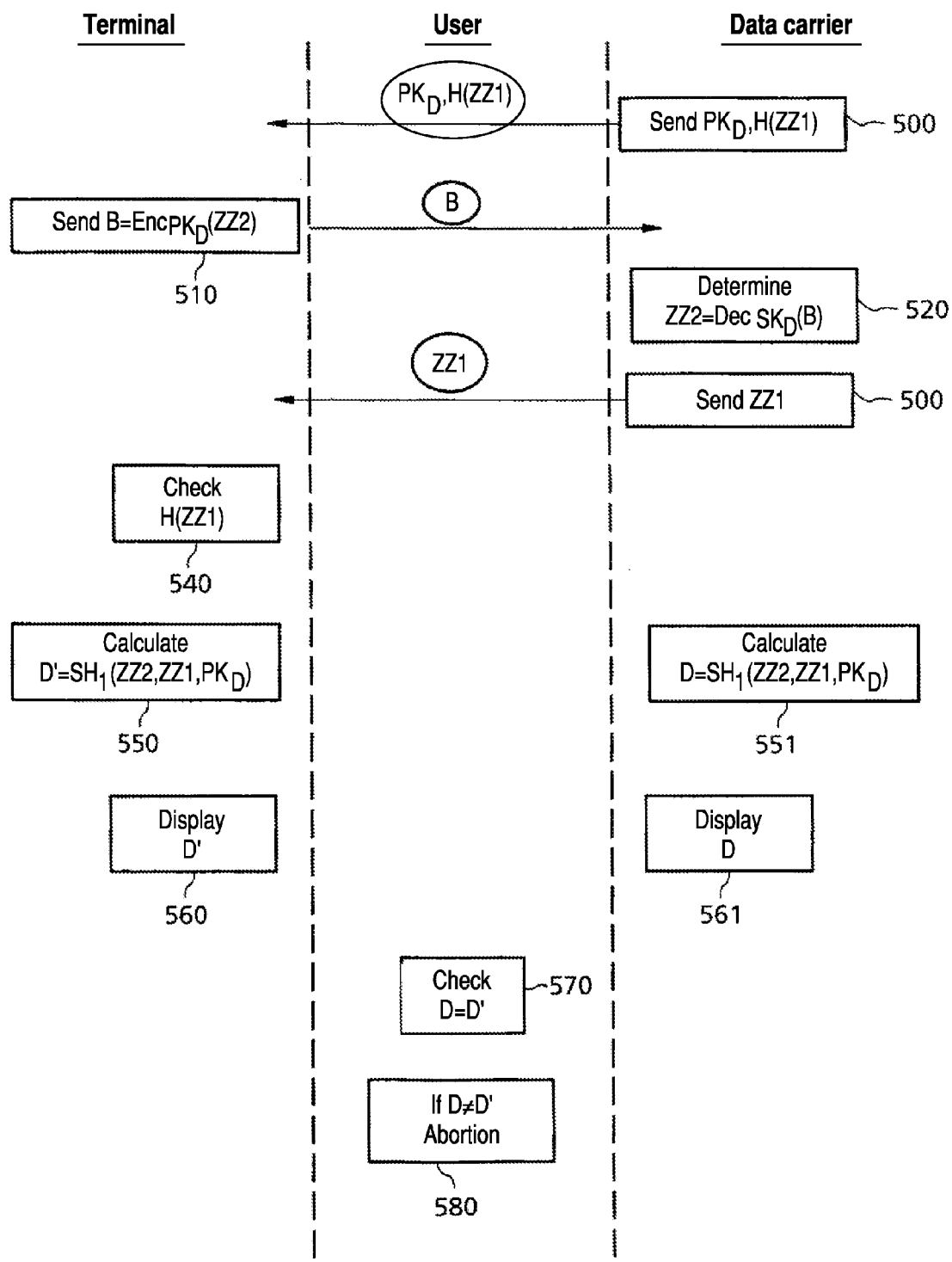

In a further variant of the invention there is first formed, as represented in FIG. 6, in step 500 a random number ZZ1 by the data carrier 10, therefrom is formed a derived value H(ZZ1) for example by means of a hash function, and the value H(ZZ1) and a public key of the data carrier $PK_D$ are sent to the terminal. Subsequently, the terminal encrypts a second random number ZZ2 with the public key $PK_D$ in a step 510 and sends the such obtained value B to the data carrier 10.

The data carrier 10 determines the value of ZZ2 by the decryption of B with the help of the private key $SK_D$ of the asymmetric key pair $PK_D$-$SK_D$ in step 520.

The data carrier 10 sends in step 530 the random number ZZ1 to the terminal, which forms in step 540 the derived value H(ZZ1) and compares it with the value H(ZZ1) transmitted by the data carrier in step 500.

In a further step 550 and 551, there are formed both by the terminal and by the data carrier 10 the derived values D' and D as derived values from ZZ2, ZZ1 and $PK_D$, and are displayed in step 560 and 561. As described in the preceding implementation variants, the values of D and D' are here, too, compared with each other by the user and a communication channel is set up only after a positive match. Otherwise, the communication between data carrier and terminal is aborted.

The random number ZZ2, which the terminal specifies, can be a so-called session key, which in the course of the further communication is used between terminal and data carrier.

Preferably, the user makes a declaration of will before the setting up of a communication connection to the terminal. The input of one or several characters to the input device of the data carrier or any other suitable declaration vis-à-vis the data carrier, such as bending the card, pressing a key or the like, makes it unmistakably clear that the user is willfully using the data carrier. Making the declaration of will can be effected at any time of the method according to the invention and of the described variants according to FIGS. 2 to 6, but preferably at the beginning or at the end of the method, but in any case before the setting up of the secure communication channel.

The invention claimed is:

1. A method for setting up a secured communication channel between a portable data carrier and a terminal on the basis of an asymmetric crypto system, the method comprising:
deriving a value from a public key of the asymmetric crypto system; and
displaying the value on a display device of the portable data carrier,
wherein the portable data carrier is a chip card.

2. The method according to claim 1, including displaying on a display device of the terminal a value derived from a public key of the crypto system.

3. The method according to claim 1, including displaying both on the display device of the portable data carrier and on the display device of the terminal both a value derived from a public key assigned to the data carrier and a value derived from a public key assigned to the terminal.

4. The method according to claim 1, wherein the value from a public key and displayed on the display device of the terminal is input to the portable data carrier via an input device of the portable data carrier and is compared in the data carrier with a value which has been derived from a public key received by the data carrier.

5. The method according to claim 1, wherein the value derived from a public key and displayed on the display device of the data carrier is input to the terminal via an input device of the terminal and is compared in the terminal with a value which has been derived from a public key received by the terminal.

6. The method according to claim 1, wherein the value derived from a public key of the crypto system is transmitted to a communication partner before the associated public key.

7. The method according to claim 1, wherein the value derived from a public key of the crypto system is formed by means of a hash function.

8. The method according to claim 1, including generating a common secret on the basis of an asymmetric crypto system using the public and the private keys of the terminal and of the data carrier.

9. The method according to claim 1, wherein the value from a public key of the crypto system is formed by means of an authentication check value.

10. The method according to claim 9, wherein a PIN for forming the authentication check value is made available.

11. The method according to claim 10, wherein the PIN is stored or is generated in the terminal, is displayed on a display device of the terminal and is input to the data carrier via an input device of the data carrier.

12. The method according to claim 1, including making a PIN for the encrypted transmission of the public key of the data carrier to the terminal.

13. The method according to claim 12, wherein the PIN is specified by the data carrier and is input to the terminal via an input device of the terminal.

14. The method according to claim 13, wherein the PIN is generated in the data carrier and is displayed on the display device of the data carrier.

15. The method according to claim 1, wherein before the setting up of a secured communication channel, the user of the data carrier makes a declaration of will vis-a-vis the data carrier.

16. The method according to claim 15, wherein the declaration of will is effected with the help of the input device of the data carrier.

17. A method for setting up a secured communication channel between a portable data carrier and a terminal on the basis of a crypto system based on a secret datum, the method comprising:
making available the secret datum by the terminal,
displaying the secret datum on a display device of the terminal, and
transferring the secret datum to the data carrier,
wherein the portable data carrier is a chip card.

18. The method according to claim 17, including transferring the secret datum to the data carrier by inputting the secret datum to the data carrier via an input device of the data carrier.

19. The method according to claim 17, wherein the secret datum is displayed on a display device of the data carrier.

20. The method according to claim 17, wherein the method is further based on an asymmetric crypto system and comprises
deriving a value from a public key of the asymmetric crypto system; and
displaying the value on a display device of the portable data carrier.

21. A portable data carrier comprising:
a display device, and
a control device configured to set up a secured communication channel to a terminal on the basis of at least one of an asymmetric crypto system and a crypto system based on a secret datum via a data communication interface of the data carrier, wherein the control device is arranged to display a value derived from a public key of the asymmetric crypto system on the display device and/or to display a secret datum received from the terminal via the data communication interface or an input device of the data carrier on the display device, wherein the portable data carrier is a chip card.

22. The data carrier according to claim 21, wherein the data carrier and the control device are arranged to derive a value from a public key of the asymmetric crypto system, and display the value on a display device of the portable data carrier.

23. A system comprising a data carrier according to claim 21, and as a terminal, wherein the terminal and the data carrier are configured to derive a value from a public key of the asymmetric crypto system, and display the value on a display device of the portable data carrier.

* * * * *